Oct. 14, 1969

E. B. OFFUTT ET AL 3,472,424

ELECTRO-MECHANICAL CONTROL APPARATUS
FOR A VENDING MACHINE

Filed Jan. 16, 1968

INVENTORS
Elmer Bradley Offutt
Leonard Bieri, Jr.

BY Schmidt, Johnson, Hovey,
Williams & Bradley
ATTORNEYS

INVENTORS
Elmer Bradley Offutt
Leonard Bieri, Jr.

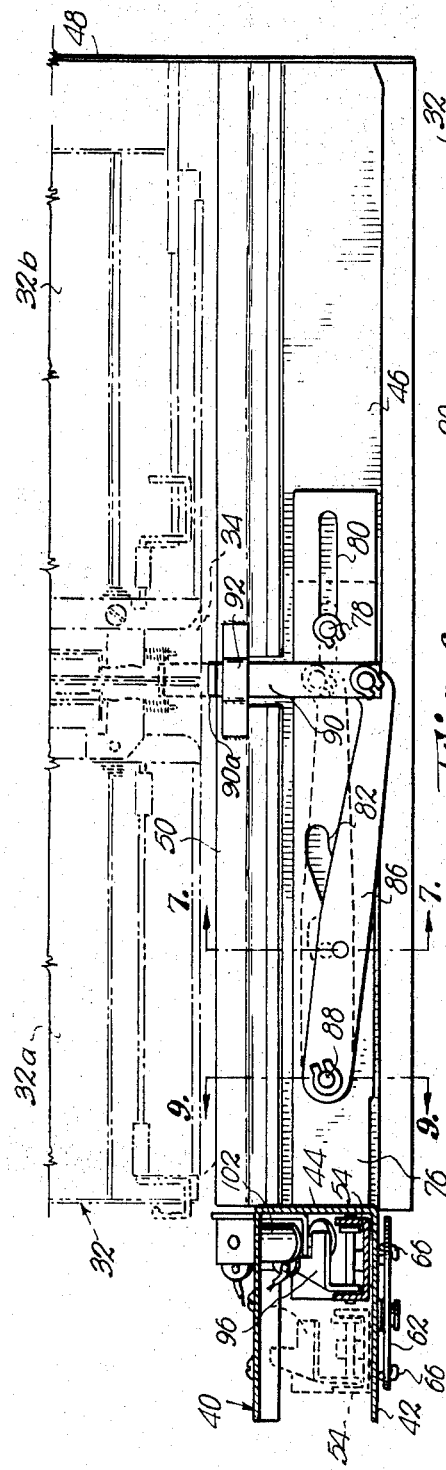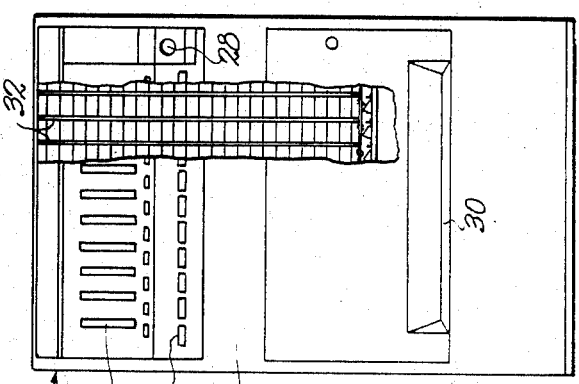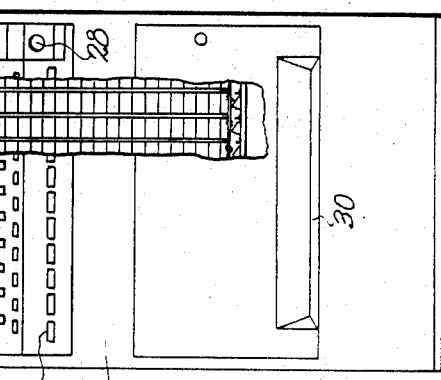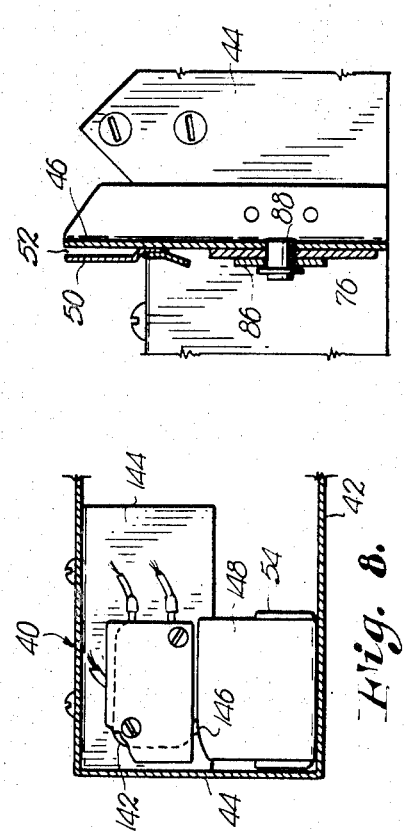
Fig. 6.
Fig. 10.
Fig. 9.
Fig. 8.
INVENTORS
Elmer Bradley Offutt
Leonard Bieri, Jr.
ATTORNEYS

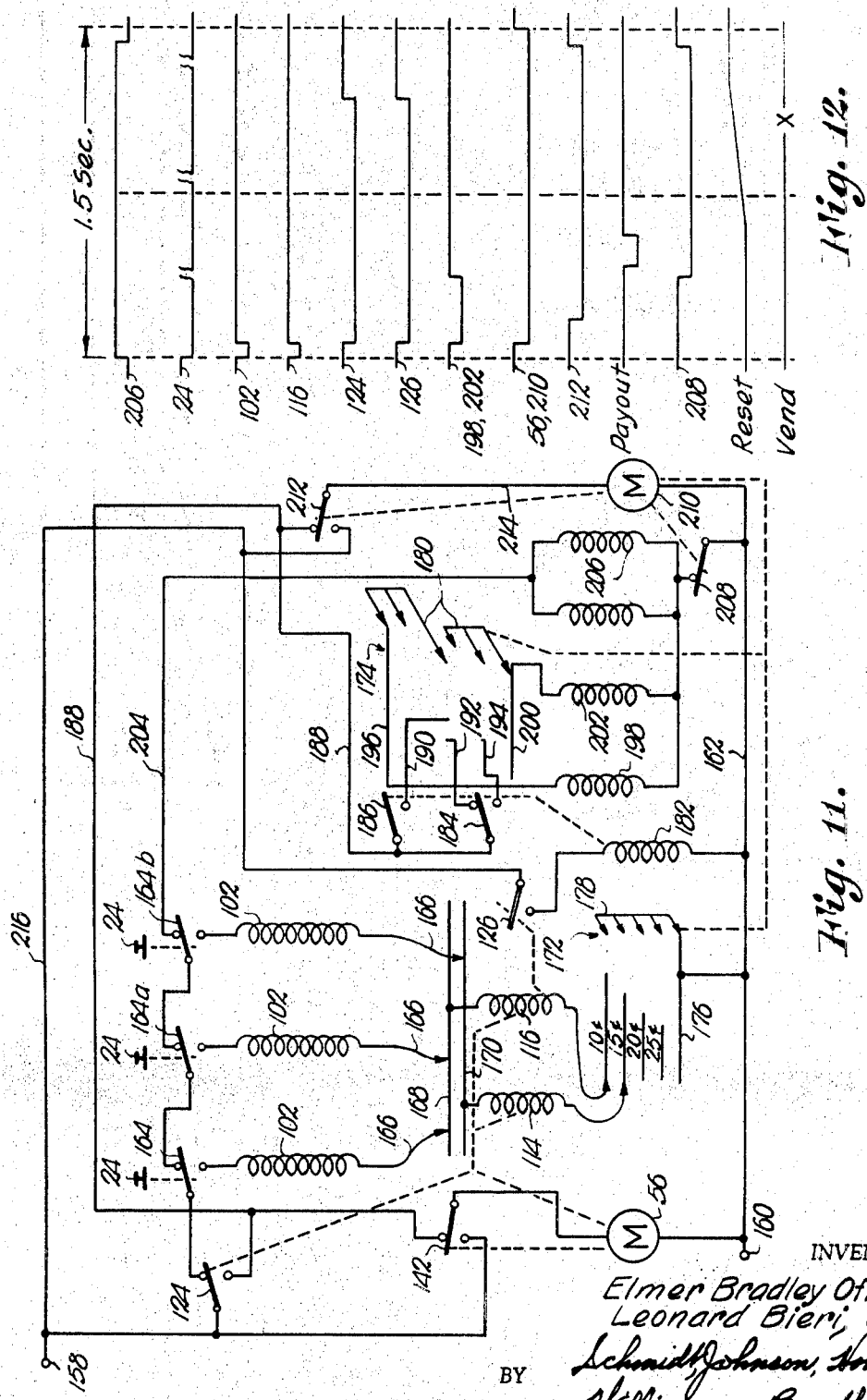

United States Patent Office 3,472,424
Patented Oct. 14, 1969

3,472,424
ELECTRO-MECHANICAL CONTROL APPARATUS FOR A VENDING MACHINE
Elmer Bradley Offutt, Independence, and Leonard Bieri, Jr., Lee's Summit, Mo., assignors to The Vendo Company, Kansas City, Mo., a corporation of Missouri
Filed Jan. 16, 1968, Ser. No. 698,233
Int. Cl. G07f 11/14
U.S. Cl. 221—129                                                17 Claims

ABSTRACT OF THE DISCLOSURE

A multiple price vending machine is controlled by electromechanical apparatus employing series connected selector switches, each of which energizes a corresponding vend solenoid and pricing solenoid upon operation thereof. The energized pricing solenoid immediately operates a start switch for the vend motor which breaks the power circuit to the selector switches, causing de-energization of the vend solenoid and pricing solenoid. Although the pricing solenoid is thus only momentarily energized, change determining circuitry is provided which remembers the price of the selected article for the purpose of effecting payout of any required change.

Figure 1:
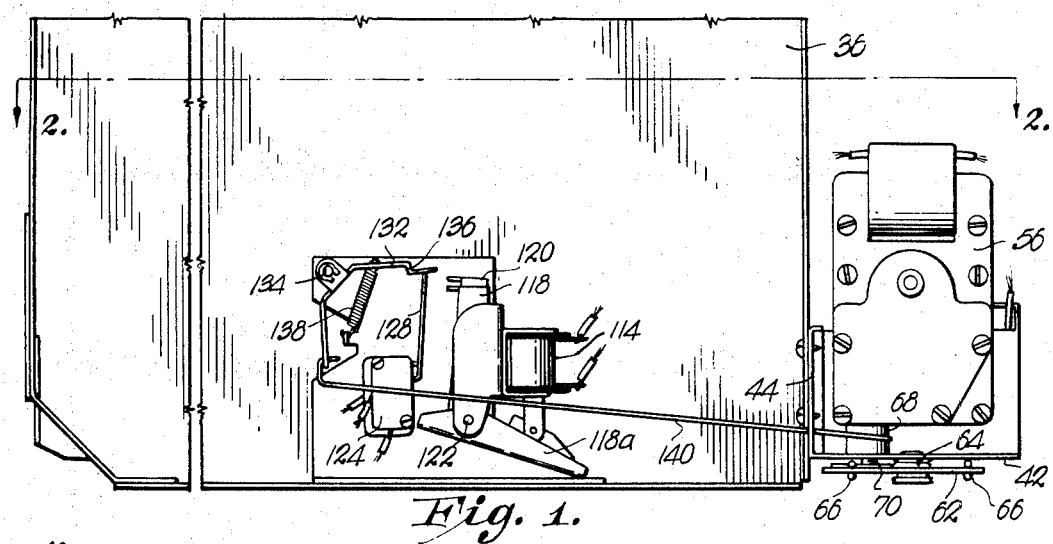

The various dispensing columns of the machine are operated by a common, horizontally reciprocable carriage mounted in front of and below the dispensing columns and, therefore, out of obstructing relationship to a frontal access opening provided for the purpose of permitting the columns to be readily restocked. Dual column dispensing magazines are employed and each is provided with a vertically reciprocable actuator therefor which is common to the two columns thereof. A vertically reciprocable lift element is disposed beneath each magazine in alignment with the actuator thereabove for operating the latter to effect the dispensing of an article from the magazine and is reciprocated by a mechanical linkage with the carriage which is coupled thereto in response to the momentary energization of the corresponding vend solenoid.

---

This invention relates to improvements in the control and operation of selective vending machines and, more specifically, to selectively operable electromechanical dispensing control apparatus having advantageous physical and operational characteristics to be set forth hereinbelow.

An important object of the instant invention is to provide a selective vending machine in which the selective operating mechanism therefor consumes a minimum amount of space within the cabinet of the machine and is disposed such that interference with the dispensing magazines during restocking of the machine is precluded.

As a corollary to the foregoing object, it is an important aim of this invention to provide mechanism as aforesaid which advantageously utilizes the space available in the door portion of the machine cabinet and yet is relatively simple in construction, requiring only that a relatively uncomplex linkage arrangement be utilized between the portion of the mechanism occupying space within the cabinet door and the operating means associated with the various dispensing magazines.

Another important object of the invention is to provide such a mechanism which contributes to ease of manufacture of the machine by virtue of its frontal location within the housing, as in the facilitating of the emplacement of wiring harnesses in the machine.

A further and important object of the invention is to provide a selectively operable electrical system in association with the aforesaid mechanism which is of simplified design and yet provides the necessary flexibility for use in connection with multiple price vending machines and, in particular, enables the prices of the articles vended by the machine to be conveniently changed as desired in accordance with price fluctuations or inventory changes.

Still another important object of the invention is to provide an electrical selection system as aforesaid capable of initiating the vend cycle in response to a momentary electrical pulse to obviate the need for an interlock for the article selector push buttons of the system, and wherein the latter is also capable of remembering the price of the selected article after termination of the pulse and de-energization of the components of the system responsive thereto in order that proper change may be paid out to the customer later in the vend cycle.

Figure 2:
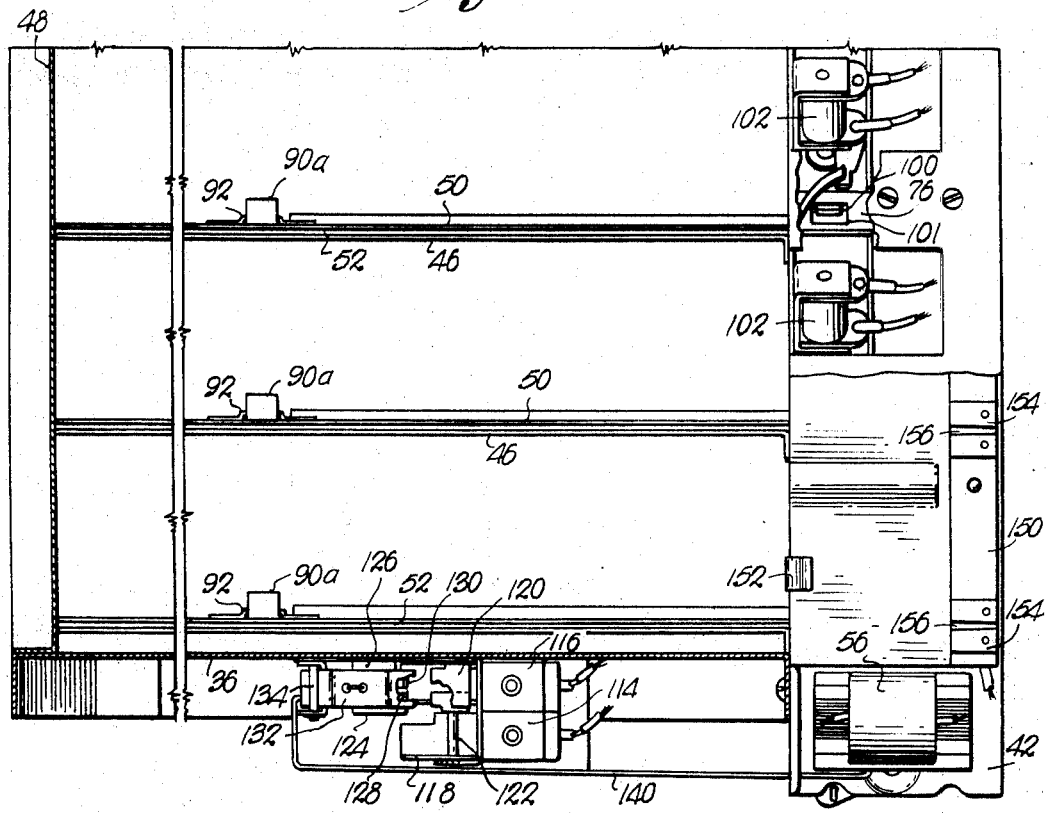
Figure 3:
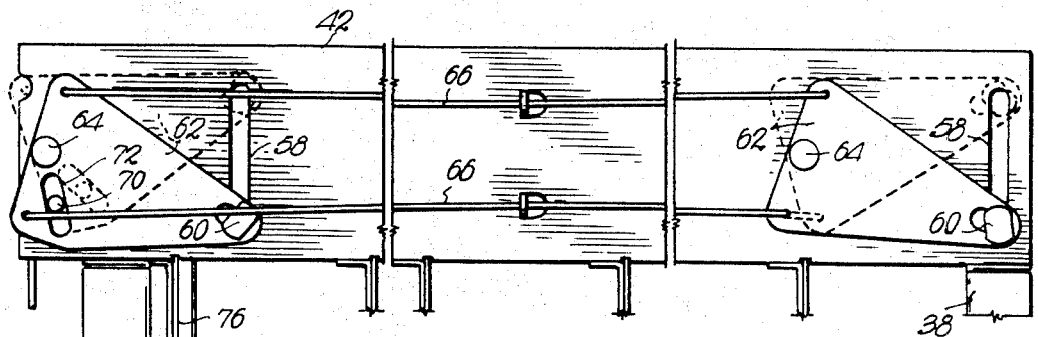
Figure 5:
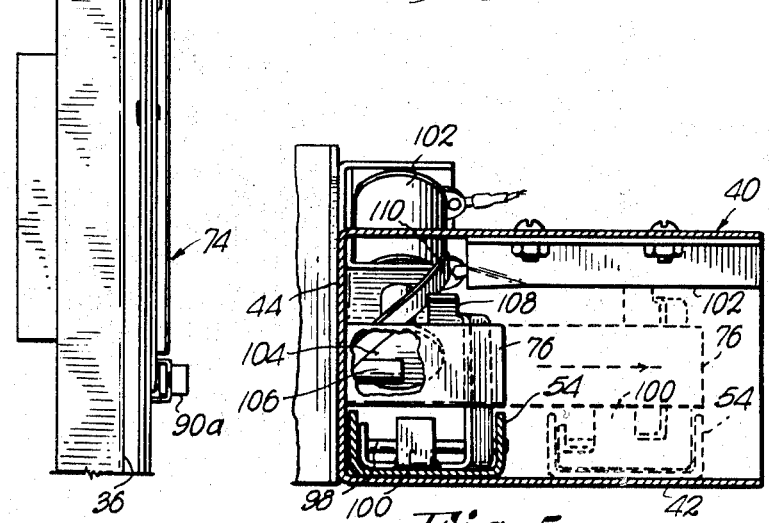
Figure 7:
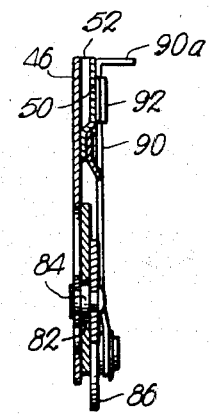
Figure 4:
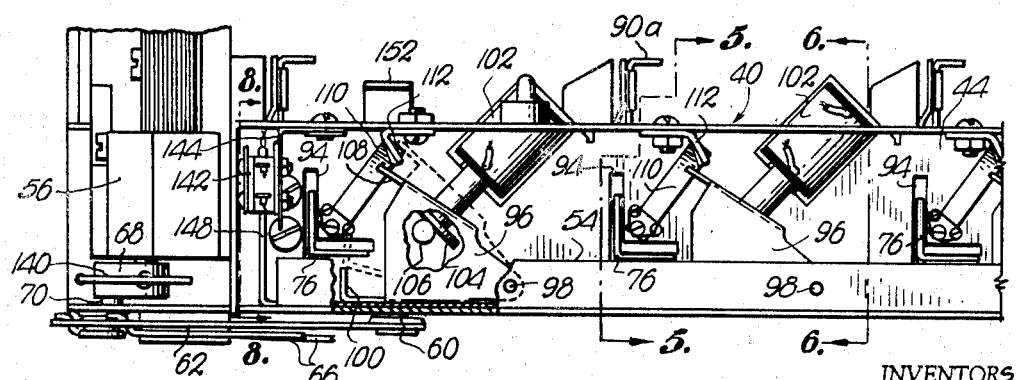

In the drawings:
FIGURE 1 is a fragmentary, side elevational view of the vending apparatus of the instant invention;
FIG. 2 is a fragmentary, horizontal sectional view taken along line 2—2 of FIG. 1;
FIG. 3 is a fragmentary, bottom plan view of the apparatus showing one of the operating structures of the control mechanism;
FIG. 4 is a fragmentary, front elevational view of the apparatus;
FIG. 5 is an enlarged, cross-sectional view taken along line 5—5 of FIG. 4;
FIG. 6 is a cross-sectional view taken along line 6—6 of FIG. 4;
FIG. 7 is an enlarged, cross-sectional view taken along line 7—7 of FIG. 6;
FIG. 8 is an enlarged, cross-sectional view taken along line 8—8 of FIG. 4;
FIG. 9 is an enlarged, cross-sectional view taken along line 9—9 of FIG. 6;
FIG. 10 is a front view of the vending machine, the door portion of the cabinet thereof being broken away to reveal the interior construction;
FIG. 11 is a schematic diagram of the electrical system of the control apparatus; and
FIG. 12 is a timing diagram illustrating the operation of the electrical system of FIG. 11.

The vending machine illustrated in FIG. 10 has a cabinet 20 provided with a front portion or door 22 which is hinged at the left side of the machine. A row of selector buttons 24 project from the front face of door portion 22 and are in general alignment with a row of display bays 26 which exhibit samples of the articles in stock within the machine. The coin slot is shown at 28 and the lower end of the delivery chute is visible at 30. The external features of the vending machine shown in FIG. 10 are exemplary of multiple price selective vending machines utilized for the vending of candy bars and similar products. A series of upright dispensing structures 32 of the drop-shelf type may be seen in FIG. 10 since a portion of the door 22 is broken away, revealing that unobstructed frontal access to the dispensing structures 32 will be provided upon opening of door 22.

In FIGS. 1–9 the elecromechanical control apparatus of the instant invention is shown in detail and has as its function the control of the operation of the various dispensing structures 32 in accordance with the wishes of the customer. One of the dispensing structures 32 is shown in phantom lines in FIG. 6 and comprises a dual column magazine having a front column 32a and a rear column 32b, an elongated, upright, vertically reciprocable common actuator bar 34 being disposed between the two dispensing columns 32a and 32b. The magazines 32 could be of various types (such as an endless belt conveyor, for example) other than the drop-shelf type illustrated, it being only important with respect to the instant invention that each magazine 32 is operable by a vertical reciprocatory motion of the actuator 34.

The housing for the control apparatus and the dispensing magazines 32 includes a left sidewall 36 (as viewed from the front) and an opposite, right sidewall 38 shown fragmentarily in FIG. 3. An elongated, horizontally extending, transversely U-shaped mounting plate 40 extends across the front of the housing, spanning the sidewalls 36 and 38 adjacent the bottoms thereof. The mounting plate 40 includes a horizontal baseplate section 42 and an upright, front plate section 44 to which the frontal margins of the sidewalls 36 and 38 are bolted.

A series of elongated, substantially rectangular, parallel plates 46 extend from the rear wall 48 of the housing to the front plate 44, each of the plates 46 being disposed on edge in a vertical plane and having an elongated strip 50 secured thereto and disposed adjacent the upper longitudinal edge thereof. In viewing FIGS. 7 and 9, it may be seen that each of the strips 50 has an offset portion therein adjacent its point of attachment to the corresponding plate 46 in order to define a channel 52 between plate 46 and strip 50 extending from rear wall 48 to front plate 44. Each of the channels 52 defines a track for a corresponding magazine 32 which receives a runner (not shown) on the bottom of the magazine 32. Normally, an upper track (not shown) would be utilized with each of the lower tracks 52 to provide a stable support for each magazine 32 which permits sliding movement thereof between the normal operative location of the magazine 32 (FIG. 6) within the housing and a location forwardly of that shown which allows both columns 32a and 32b of the magazine to be conveniently restocked. In this respect, it should be understood that the side margins and bottom of a frontal access opening are defined by the sidewalls 36 and 38 and the mounting plate 40 respectively, such opening permitting free sliding movement of the magaziness 32 on their tracks 52 when the door 22 of the exterior cabinet is opened by servicing personnel.

An elongated, horizontal carriage 54 in the form of an elongated channel member is mounted on baseplate 42 and is driven by a vend motor 56 secured to the left end of mounting plate 40. As may be seen in FIG. 3, the baseplate 42 has a pair of transverse guide slots 58 therein adjacent the ends thereof which receive a pair of pins 60 depending from carriage 54. Thus, the carriage 54 is mounted for horizontal, reciprocal movement along baseplate 42 at right angles to the longitudinal axis of carriage 54. A drive linkage between electric motor 56 and the carriage 54 is provided by a pair of double bell cranks 62 beneath baseplate 42 and pivotally attached thereto at points 64. Two apexes of each of the bell cranks 62 are joined to corresponding apexes of the other bell crank 62 by a pair of wires 66 which serve as force-transmitting tension members, the remaining apex of each bell crank 62 being slotted and receiving the corresponding pin 60 depending from carriage 54. An eccentric disc 68 is rigid with the output shaft of motor 56 and is provided with a crankpin 70 eccentric to the axis of disc 68, the latter extending through baseplate 42 and being received within a slot 72 in the underlying bell crank 62. Thus, as disc 68 and pin 70 rotate, the left bell crank 62 follows the motion of pin 70 and oscillates about its pivot point 64, such motion being transmitted to the other bell crank 62 by the wires 66. In this manner, the carriage 54 is evenly driven at both of its ends to assure that the transverse displacement of the carriage will be uniform along its length.

An operating structure 74 for each of the dual column magazines 32 respectively is mounted on the plate 46 underlying the respective magazine 32. Each structure 74 includes an elongated, horizontally extending, horizontally reciprocable drive member 76 in the form of a generally rectangular cam plate disposed in juxtaposition with plate 46. A guide pin 78 projects laterally from plate 46 and is received in a horizontal slot 80 in drive member 76 adjacent the inner end thereof. A curved cam slot 82 is provided in member 76 approximately intermediate its ends, the slot 82 receiving a follower 84 (FIG. 7) rigid with a swingable arm 86 having its outer end pinned to plate 46 at 88. The cam slot 82 extends forwardly to provide a clearance opening for pin 88 to permit the drive member 76 to reciprocate without interfering with pin 88.

The inner end of arm 86 is pivotally connected to an elongated, upright lift element 90 which is confined by a guide 92 on strip 50 to vertical reciprocatory motion. The upper end of element 90 is bent over at 90a to provide increased surface contact between the upper end of element 90 and the lower end of the actuator 34 thereabove when element 90 is vertically reciprocated.

The forward end of each drive member 76 is formed into an angle-shaped configuration and extends through a corresponding clearance opening 94 in front plate 44 having vertically and horizontally extending slot segments. A series of pivotal coupling elements 96 are mounted on carriage 54 and are spaced apart longitudinally thereof, each coupling element 96 being attached to carriage 54 by a horizontal hinge pin 98 spanning the two upright flange portions of the channel-shaped carriage 54. Each coupling element 96 has a tongue portion 100 receivable within a vertical opening 101 (FIG. 2) in the horizontal leg of the outer end of the drive member 76 thereabove. A selection component in the form of a vend solenoid 102 is mounted on plate 40 above each of the coupling elements 96 respectively and has an armature 104 that raises and lowers element 96, swinging the latter about its hinge pin 98. It may be noted in FIG. 5 that a stud 106 projects forwardly from front plate 44 to provide a stop for limiting downward movement of armature 104 upon de-energization of solenoid 102, the armature 104 having an enlarged lower end of increased diameter so that the same will extend beneath a flange portion 108 of element 96 and lift the latter upon upward movement of armature 104 by energization of solenoid 102.

A leaf spring 110 is secured to the front face of front plate 44 adjacent each corresponding element 96 respectively and serves as a means of holding the respective element 96 in its raised position after the same is lifted by the corresponding solenoid 102. As will be appreciated hereinafter, the selected vend solenoid 102 is only energized for a brief interval, requiring that mechanical means be utilized to hold the coupling element 96 in its raised position.

In comparing FIGS. 4 and 5, it may be seen that a series of guides 112 are secured to mounting plate 40 and extended in directions parallel to the path of reciprocation of carriage 54; furthermore, each guide 112 has its inner or rear end disposed in closely spaced relationship to the upper tip of a corresponding leaf spring 110. Each guide 112 serves as a means for retaining the corresponding coupling element 96 in its raised position (if the corresponding vend solenoid 102 is energized by the customer in making a selection) during reciprocation of carriage 54 after the flange portion 108 of element 96 has moved away from spring 110 and is no longer held thereby.

Referring particularly to FIGS. 1 and 2, it may be seen that a pair of solenoids 114 and 116 are mounted on the left sidewall 36 and, as will be appreciated hereinafter, comprise electrically responsive pricing devices of the electrical system of the control apparatus. A pair of upright, pivotal operating arms 118 and 120 have their lower ends mounted on a common pivot pin 122 extending horizontally from sidewall 36. The solenoid 114 has its armature pivotally connected to an extension 118a of arm 118, and the solenoid 116 has its armature pivotally connected to a similar extension (hidden from view behind extension 118a in FIG. 1) of arm 120.

A pair of switches 124 and 126 are mounted side-by-side on sidewall 36 and have operating fingers 128 and 130 respectively which extend upwardly beneath a common latch 132 pivotal about a horizontal pin 134. Upon energization of solenoid 114 to swing arm 118 in a counterclockwise direction about hinge pin 122 as viewed in FIG. 1, finger 128 is engaged by the upper tip of arm 118 to actuate switch 124, the finger 128 then being held in the actuated position by the offset catch 136 formed in the forward tip portion of latch 132. Instead, if the other solenoid 116 is energized, arm 120 is pivoted about pin 122 to bring its broader upper end into engagement with both of the actuator fingers 128 and 130 to thereby operate both of the switches 124 and 126, whereupon the same are maintained in their actuated conditions by the latching of both of the fingers 128 and 130.

The latch 132 is biased in a clockwise direction as viewed in FIG. 1 by the action of a spring 138 connected thereto; thus the catch 136 will hold finger 128 or both of the fingers 128 and 130 in the actuated positions thereof until the latch 132 is subsequently released. As will become clear hereinafter, this is important in the instant invention since it permits the vend cycle to be initiated by only a momentary energization of either of the pricing solenoids 114 or 116. The switch 124 is a single-pole, double-throw motor start switch for the vend motor 56, and the switch 126 is a normally open, single pole price remembering switch whose function will be discussed fully hereinafter. Return of either or both of the switches 124 or 126 to the normal, standby condition later in the vend cycle is accomplished by a linkage rod 140 which is connected to the latch 132 and is configured to ride on the surface of the eccentric disc 68 in the manner of a cam follower, the forward end of the rod 140 being held in contact with the periphery of disc 68 by the action of the latch spring 138. Toward the end of the vend cycle, the rod 140 has been shifted forwardly a sufficient distance to raise the catch 136 clear of finger 128 or fingers 128 and 130 against the action of spring 138.

A stop switch 142 for vend motor 56 is visible in FIGS. 4 and 8 and is mounted beneath the upper plate section of mounting plate 40 by a bracket 144. The switch 142 is of the single-pole, double-throw type and is provided with an actuator button 146 which is normally held depressed by an upturned end flange 148 which forms a part of the reciprocal carriage 54.

Referring to FIG. 2, a cover 150 for the vend solenoids 102 and associated mechanical components is illustrated fragmentarily, the cover 150 being disposed in overlying relationship to solenoids 102 and held in place by a number of clips 152 projecting upwardly from front plate 44. A series of plastic blocks 154 are mounted on the top of cover 150 at the forward edge thereof and are each provided with a groove 156 aligned with a corresponding track 52. The grooved blocks 154 serve as guides or track extensions for the magazines 32 when the latter are shifted forwardly for restocking.

Referring to the electrical system illustrated in FIG. 11, the vend solenoids 102, the motor start switch 124, the pricing solenoids 114 and 116, the switch 126 operated by solenoid 116, the motor stop switch 142, and the vend motor 56 are illustrated schematically in association with the other circuitry of the system. A pair of power terminals 158 and 160 are connected to an available electrical power source, the terminal 158 being connected to the movable pole of start switch 124 and the normally open contact of stop switch 142. The movable pole of stop switch 142 is connected to the vend motor 56, the other electrical side of motor 56 being connected to a common return lead 162 extending from the other power terminal 160.

Three single-pole, double-throw article selector switches 164, 164a and 164b are illustrated and are selectively operated by the customer by the depressing of associated push buttons 24. It should be understood that as many selector switches would be provided as there are magazines in the machine. The selector switches are interconnected in series, laddered relationship to one another, the first switch 164 of the series having its movable pole connected to the normally closed contact of start switch 124.

The term "laddered" as herein used denotes the series interconnection of the selector switches illustrated wherein the circuit path through the series selector switches normally extends from the normally closed contact of each switch to the movable pole of the next succeeding switch of the series except, of course, for the last switch 164b of such series.

Each of the selector switches 164–164b, when operated, establishes a series circuit through the corresponding vend or selection solenoid 102 connected to the normally open contact thereof, and the pricing solenoid 114 or 116 as the case may be. Note that a programming lead 166 extends from the lower end of each vend solenoid 102 to one of two contact tracks 168 or 170, the pricing solenoid 114 being connected to the lower track 170 and the pricing solenoid 116 being connected to the upper track 168.

The contact tracks 168 and 170 may comprise conductive terminal strips and may be disposed adjacent the various vend solenoids 102 in a manner to be conveniently accessible, such as along the front of the mounting plate 40. Thus, the leads 166 would be selectively connectable to tracks 168 and 170 to set the prices of the articles of the various magazines 32.

The lower ends of the pricing solenoids 116 and 114 are connected to the 10¢ and 15¢ conductive segments respectively of the credit section 172 of a deposit totalizer illustrated diagrammatically. The totalizer also has a change-determining section 174 to be discussed hereinafter. The totalizer is of the general type shown and described in our copending application Ser. No. 611,047, filed Jan. 23, 1967, now Patent No. 3,406,803 and entitled "Multi-Price Coin Changer Having a Dual Denomination Payout." The various conductive segments designated 10¢ through 25¢ and the common segment 176 are arranged on a printed circuit board and are contacted by a wiper 178 which is illustrated in its standby position corresponding to no deposit. In standby, it will be noted that the wiper 178 contacts only the common segment 176. The wiper 178 is mechanically a part of a wiper 180 associated with the change section 174 of the totalizer, the wipers 178 and 180 being carried by an escapement controlled, spring-biased rotor (not shown) which shifts through an angular displacement proportional to the amount of each deposit received by the coin acceptor of the machine. The escapement is operated by the weight of deposited coinage gravitating through the acceptor, a suitable form of such escapement and other details of the totalizer structure being fully shown and described in our aforesaid copending application, the latter being incorporated herein by reference as may be necessary for a full and complete understanding of the construction and operation of totalizers of this type.

A price relay has a coil 182 connected between the normally open contact of price switch 126 and the return lead 162, and two relay switches 184 and 186 which have their movable poles connected to the normally open contact of start switch 124 and the normally closed contact of stop switch 142 by a lead 188. The change section 174 includes three conductive segments 190, 192 and 194 connected to the normally open contact of switch 186 and the normally closed and open contacts of switch 184 respectively. Additionally, a conductive segment 196 is connected to a 5¢ payout solenoid 198, and a conductive segment 200 is connected to a 10¢ payout solenoid 202. The wiper 180 is provided with six contacts arranged in two electrically interconnected groups of three, the uppermost contact of the upper group riding on segment 196, while the lowermost contact of the lower group rides on segment 200.

A lead 204 extends from the last selector switch 164b to a pair of coin return electromagnets 206 connected in parallel and normally connected to return lead 162 by a normally closed switch 208 operated by a change payout motor 210. The payout solenoids 198 and 202 are also returned to the common lead 162 through switch 208. Furthermore, the changer motor 210 controls a motor carry-over switch 212 having its movable pole connected in series between lead 188 and a lead 214 extending to motor 210. A power lead 216 is connected to terminal 158 and extends to the normally open contact of carry-over switch 212 and the movable pole of price switch 126. The changer motor 210 and the payout solenoids 198 and 202 form a part of a coin changing mechanism which may be of the type disclosed in our aforesaid copending application.

OPERATION

FIGURE 12 graphically illustrates the timing of the various switches, solenoids and motors in the electrical system of FIG. 11, and also graphically depicts the times of occurrence of certain other functions to be discussed. The duration of the vend cycle is shown as 1.5 seconds; this is purely illustrative but would be typical in machines of this type. In standby, the coin return electromagnets 206 are energized and all other electrical components are de-energized. Customarily, the coin return electromagnets are utilized to preclude passage of coinage through the coin acceptor after a vend cycle has been initiated or when the machine is inoperative deposited coins under these conditions being returned directly to the customer. It should be further understood that the electrical system of FIG. 11 is simplified to show only those functions of significance with respect to the teachings of the instant invention.

In the control apparatus shown herein, two article prices (either 10¢ or 15¢) are possible, it being understood that additional pricing solenoids could be employed in machines where it is desired to have a greater possible price selection. This, of course, would necessitate the adding of price selection tracks in addition to the tracks 168 and 170 illustrated, and would require an extension of the change-determining circuitry to be discussed more fully hereinafter.

Assuming that a customer desires to purchase a 10¢ article stocked by the dispensing magazine 32 corresponding to selector switch 164a, and that the customer deposits 25¢ in the machine, the following occurs: When the deposit is made, the totalizer wipers 178 and 180 move to the left through a corresponding displacement, resulting in the next to the lowermost contact of wiper 178 being shifted into engagement with the 25¢ conductive segment of credit section 172. There is no article priced at 25¢, but this movement of wiper 178 also brings the three uppermost contacts thereof into engagement with the 10¢, 15¢ and 20¢ segments, thereby establishing electrical continuity between the 10¢ segment (to which pricing solenoid 116 is connected) and the common power lead 162. Similarly, the wiper 180 of the change section 174 also advances to the left through a displacement proportional to a 25¢ deposit, whereby the middle contact of the upper contact group or triplet of wiper 180 is shifted into engagement with contact segment 190 and the middle contact of the lower group or triplet is shifted into engagement with the contact segment 194 (such engagement with contact segment 194 would also occur if only 20¢ were deposited, but the middle contact of the lower wiper group continues to ride along segment 194 during the additional 5¢ displacement increment). Thus, segments 190 and 196 are now electrically interconnected, and segments 194 and 200 are electrically interconnected.

Before proceeding with the instant operational example, in order that the symbolic representations of the totalizer wipers and associated conductive segments may be fully understood, a 25¢ deposit is required to shift the center contact of the upper group of wiper 180 into engagement with segment 190, a 15¢ deposit shifts the lower wiper of the upper group into engagement with segment 190, a 20¢ deposit shifts the last mentioned contact into engagement with segment 192, a 25¢ deposit shifts the upper contact of the lower group of wiper 180 into engagement with segment 192, and a 20¢ deposit shifts the middle contact of the lower group into engagement with segment 194. The uppermost and lowermost contacts of wiper 180 travel along segments 196 and 200 respectively as wiper 180 shifts to the left in response to the deposit of coinage, and the lowermost contact of wiper 178 travels along segment 176 in similar fashion. Therefore, it will be appreciated that the staggering of the various segments and contacts accomplishes the logic of system, which will become clear as the instant example proceeds.

When the selector button 24 of the selector switch 164a is depressed by the customer after the 25¢ deposit is made, the following series circuit is established between the power terminals 158 and 160: through start switch 124 and the first selector switch 164 to the movable pole of the operated selector switch 164a, through the lower contact of selector switch 164a and the vend or selection solenoid 102 connected thereto to the pricing track 168, through the pricing solenoid 116 to the 10¢ price segment in credit section 172, and thence through the wiper 178 to segment 176 and common power lead 162. Energization of pricing solenoid 116 immediately actuates start switch 124 and price switch 126 to start the vend motor 56 and remove power from the series connected selector switches 164–164b. The customer may release the push button 24 at any time during or after the vend cycle, as illustrated in FIG. 12.

The start switch 124 and the price switch 126 remain actuated even though the pricing solenoid 116 is immediately denergized due to the action of the latch 132 illustrated in FIGS. 1 and 2 and described hereinabove. As is clear in FIG. 12, once the push button 24 is depressed, the coin return electromagnets 206 are de-energized to block the coin passages in the acceptor. The closure of price switch 126 energizes relay coil 182 to operate switches 184 and 186, thereby connecting segments 194 and 190 to power terminal 158 via lead 188 and start switch 124. This energizes both of the payout solenoids 198 and 202 via current paths through the wiper 180 to condition the changer for payout of 15¢ in change. Additionally, the changer motor 210 is energized via lead 188, carry-over switch 212, and lead 214. The carry-over switch 212 and the switch 208 may be cam-operated from the shaft of changer motor 210, both of the same being operated shortly after commencement of the vend cycle as illustrated in FIG. 12. Changer motor 210 continues to operate, however, after the carry-over switch 212 is actuated since the carry-over switch 212 then connects motor 210 directly to power terminal 158 via lead 216.

The opening of switch 208 by changer motor 210 de-energizes the payout solenoids 198 and 202, their function being completed as indicated by the "payout" graph that illustrates the approximate point in time during the vend cycle when the change coinage is actually discharged from the coin slides of the changer. The opened switch 208 then serves to maintain the coin return electromagnets 206 de-energized until the end of the vend cycle, since the start switch 124 will return to its normal position prior to the close of the vend cycle. The "reset" graph illustrates that the changer motor 210, as in our aforesaid copending application, returns the wipers 178 and 180 to their normal zero credit positions following the completion of the payout function. The graph designated "vend" indicates the approximate point in time when vending of the article occurs.

Turning now to the mechanical components of the system which effect the dispensing of the desired article, it should be understood that the carriage 54 is driven through one cycle of reciprocation by the vend motor 56 during each and every vend cycle regardless of which article is selected. The carriage 54 is coupled to the drive member 76 corresponding to the magazine containing the selected article. Such drive member 76, in turn, causes the associated lift element 90 to reciprocate along a vertical path which raises and lowers the actuator 34 of the magazine 32, thereby dispensing the selected article which, in the drop-shelf type magazine illustrated, gravitates from one of the shelves and passes between the adjacent, spaced tracks 52 therebelow to a common delivery chute for all of the columns which terminates at 30 as illustrated in FIG. 10.

Coupling of the carriage 54 with the appropriate drive member 76 is accomplished in an identical manner for each of the dispensing magazines 32. Attention is particularly directed to FIGS. 2, 4, 5 and 6, and it is assumed that the second vend solenoid 102 from the left is energized when selector switch 164a is operated by the customer. During momentary energization of such solenoid 102, the associated coupling element 96 is raised and then held in its raised position by the holding spring 110. The raised position of the coupling element 96 actuated by the first vend solenoid 102 is illustrated in FIG. 4 in broken lines. This action inserts the tongue portion 100 of coupling element 96 into the opening 101 in the outer end of drive member 76 (see FIG. 2 where the opening 101 in the drive member 76 associated with the third solenoid 102 is shown). As the carriage 54 advances forwardly toward the broken line position thereof illustrated in FIG. 5, the coupling element 96 is held in its raised position since the flange portion 108 thereof moves off of spring 110 but into overlying relationship to the associated guide 112. This draws the drive member 76 with carriage 54 as it advances to the limit of its forward movement and returns.

As the drive member 76 reciprocates, the arm 86 associated therewith is cammed by the action of camming slot 82 and follower 84 to cause the arm to swing about pin 88 to the broken line position thereof illustrated in FIG. 6, thereby forcing the lift element 90 upwardly to raise the actuator 34 of the magazine 32 thereabove. When carriage 54 returns to its initial or standby position shown in full lines, the lift element 90 has returned to the full-line position thereof where its head 90a clears the lower end of actuator 34.

As the carriage 54 approaches its standby position after nearly completing a cycle of reciprocation, the flange portion 108 of the coupling element 96 clears the rear end of guide 112 and is directed between the latter and the upper end portion of spring 110; therefore, the coupling element 96 returns to its standby position since support for the flange portion 108 thereof is no longer available. This disconnects carriage 54 from the drive member 76 since the tongue portion 100 of coupling element 96 is withdrawn from the opening 101 in the forward end of drive member 76.

Referring particularly to FIGS. 8, 11 and 12, it may be seen that the motor stop switch 142 changes from its standby condition once the carriage 54 commences forward movement, thereby connecting vend motor 56 to power terminal 158 through the operated stop switch 142 rather than the start switch 124. However, the start switch 124 returns to its standby position before the stop switch 142 is returned to standby by the carriage 54; thus, de-energization of the vend motor 56 is controlled by the time of actuation of the stop switch 142. This occurs at the end of the vend cycle, the physical arrangement of stop switch 142 and its actuator button 146 with respect to the end flange 148 of carriage 54 being such as to effect de-energization of vend motor 56 at substantially the same time that operation of the changer motor 210 ceases.

From the foregoing, it may be appreciated that a mechanical interlock for the various push buttons 24 is not required since the vend cycle is initiated in response to a momentary pulse which commences at the time a particular selector switch is operated by the customer and terminates when the start switch 124 is actuated by the energization of either of the pricing solenoids 114 or 116. In this respect, it should be understood that only one-way protection is provided by the laddered selector switches 164–164b themselves in that, for example, actuation of switch 164a removes power from switch 164b but does not preclude subsequent operation of switch 164 to energize its associated vend solenoid 102. However, since the start switch 124 of the instant invention is connected in series with the first selector switch 164, such start switch 124 being nearly instantaneously actuated once one of the selector switches 164–164b is operated, it is nearly impossible for an unscrupulous customer to obtain articles from more than one dispensing magazine in a single vend.

Although the vend is initiated by a pulse of very short duration, the control apparatus of the instant invention remembers the price of the selected article by either operating or not operating switch 126. In the case of the lower of the two prices, switch 126 is closed upon energization of the pricing solenoid 116 to, in turn, energize relay coil 182 and transfer the switches 184 and 186. In this manner, the logic of the change determining section 174 of the totalizer is set for the 10¢ article price.

In the event that a 15¢ article is selected, resulting in the energization of pricing solenoid 114, the higher price is also remembered since, in this case, switch 126 remains open and relay coil 182 is not energized. Therefore, the switches 184 and 186 remain in the normal positions thereof illustrated, resulting in power being applied to the contact segment 192 through switch 184. If 25¢ is deposited as in the first example above, the wiper 180 shifts leftwardly to a position where the upper contact of the lower group or triplet is brought into engagement with segment 192 to establish electrical continuity through switch 184 and segment 192 to the 10¢ payout solenoid 202. If a 20¢ deposit is made, the upper contact of the lower group of wiper 180 will not reach the segment 192; however, the lower contact of the upper group or triplet will reach segment 192 to energize the 5¢ payout solenoid 198.

Having thus described the invention, what is claimed as new and desired to be secured by Letters Patent is:

1. In an article dispensing machine provided with a series of dispensing columns and a housing for said columns having a front portion forwardly of said columns and an opening behind said portion providing frontal access to said columns to permit restocking thereof, where each column is provided with an actuator therefor reciprocable along a generally upright path for discharging an article from the column, the improvement comprising:
   a carriage mounted in said portion for generally horizontal reciprocal movement;
   reciprocable operating structure associated with each of said actuators respectively and extending forwardly to a location adjacent said carriage;
   selectively operable means adjacent said carriage for coupling the latter with any one of said structures; and
   a prime mover coupled with said carriage for reciprocating the latter to, in turn, reciprocate a selected structure upon operation of said selectively operable means,
   each of said structures having means engageable with the corresponding actuator for reciprocating the latter along said path thereof when the structure is reciprocated by the carriage.

2. The invention of claim 1,
   there being means mounting said carriage in said portion below the level of said columns,
   said structures extending beneath said columns.

3. The invention of claim 2,
   each of said structure including a generally horizontally reciprocable drive member underlying the corresponding column between the actuator therefor and said carriage,
   said actuator reciprocating means of each structure being responsive to reciprocation of the drive member thereof for effecting said reciprocation of the corresponding actuator.

4. The invention of claim 3, said actuator reciprocating means of each structure comprising a reciprocable lift element disposed beneath the corresponding actuator and aligned therewith.

5. In an article dispensing machine having a series of dispensing columns, each column being provided with an actuator therefor reciprocable along a generally upright path for discharging an article from the column, the combination with the actuators of:
   a carriage spaced from said actuators and mounted for generally horizontal reciprocal movement;
   operating structure associated with each of said actuators respectively and including a reciprocable drive member extending to a location adjacent said carriage;
   selectively operable means adjacent said carriage for coupling the latter with any one of said members; and
   a prime mover coupled with said carriage for reciprocating the latter to, in turn, reciprocate a selected member upon operation of said selectively operable means,
   each of said structures having means engageable with the corresponding actuator for reciprocating the latter along said path thereof when the drive member of the structure is reciprocated by the carriage.

6. The invention of claim 5, said selectively operable means including a series of shiftable coupling elements mounted on said carriage, each coupling element being engageable with a corresponding drive member, and an article selection component operable associated with each of said coupling elements respectively for shifting the respective element to an operative position effecting interconnecting of the corresponding drive member and the carriage during reciprocation of the latter.

7. The invention of claim 6,
   each of said selection components being electrically operable,
   said selectively operable means further including selector switch means electrically coupled with said components for selectively operating the latter, and retaining means engageable with said coupling elements for maintaining an operated element in said position thereof during reciprocation of said carriage.

8. The invention of claim 7,
   said selector switch means effecting momentary energization of a selected component when a selection is made,
   said selectively operable means having means engaging the coupling element operated by the selected component to hold the operated element in its operative position after de-energization of the selected component and prior to reciprocation of the carriage.

9. The invention of claim 8, said retaining means comprising a generally horizontally extending, stationary guide adjacent each coupling element respectively and receiving the respective element when the latter is in its operated position and upon reciprocation of said carriage.

10. In an article dispensing machine having a series of dual column dispensing magazines, a housing for said magazines, and track means supporting each magazine for movement outwardly of said housing away from a normal, operative location therewithin to permit restocking of both columns of the magazine, where each magazine is provided with an actuator therefor disposed between the columns thereof and reciprocable along a generally upright path for discharging an article from the magazine, the improvement comprising:
   a reciprocable lift element engageable with each of said actuators respectively for operating the latter and disposed beneath the respective actuator when the magazine actuated thereby is in its normal location,
   each element having a normal position clearing the magazine thereabove, whereby to permit movement of the latter along the track means without interference, and a raised position above said normal position; and
   selectively operable mechanism coupled with said elements for reciprocating any one of the elements between said positions thereof to shift the selected element into engagement with the respective actuator, when the magazine actuated thereby is in its normal location, to reciprocate the actuator and thereby dispense the desired article.

11. The invention of claim 10, said mechanism including a reciprocable drive member for each of said elements respectively having camming means thereon, and follower structure engageable with the camming means of each of said drive members respectively and coupled with a corresponding element for effecting said shifting of the selected element as the corresponding drive member is reciprocated.

12. The invention of claim 11,
   said drive members being elongated, longitudinally reciprocable in substantially parallelism with said track means, and generally horizontally disposed beneath said magazines,
   said mechanism further including an elongated carriage extending across said drive members and mounted for generally horizontal reciprocal movement transversely of its longitudinal axis, and means on said carriage for coupling the latter with any one of said drive members; and
   a prime mover coupled with said carriage for reciprocating the latter to, in turn, reciprocate a selected drive member upon operation of said coupling means.

13. Control apparatus for a multiple price vending machine having a plurality of article dispensing structures, said apparatus comprising:
   an electrically responsive article selection component for each of said structures respectively;
   price setting means including a plurality of electrically responsive pricing devices each representing a different article price;
   circuit means connecting each of said selection components in series with the pricing device representing the price of articles dispensed by the corresponding structure;
   a plurality of series connected, laddered article selector switches, each corresponding to a different one of said structures,
   each selector switch, upon article selecting operation thereof, establishing a series circuit through the operated selector switch, the corresponding selection component, and the pricing device in series therewith;
   circuitry coupled with the first of said selector switches and said pricing devices and responsive to the deposit of money in the machine for causing current flow in said series circuit to energize the selection component and pricing device thereof if the value of the deposit at least equals the price of the selected article;
   means coupled with said structures and responsive to energization of any of said selection components for actuating the corresponding structure to dispense the selected article;
   switching means interposed in said circuitry, coupled with said pricing devices and responsive to energization of any one of the pricing devices for interrupting said current flow, whereby the energized selection component and pricing device are immediately de-energized; and
   change determining means coupled with said price setting means for remembering the price of the selected article after said current interrupting operation of said switching means.

14. The invention of claim 13, said circuitry being adapted for connection to a source of said current and including a credit totalizer for establishing electrical continuity between said source and the device or devices representing prices equal to or less than the value of said deposit.

15. The invention of claim 14, said switching means being coupled in series with said selector switches and having a normal condition for supplying said current to said first selector switch.

16. In control apparatus for a multiple column article dispensing machine:
an elongated carriage having a pair of opposed ends and mounted for reciprocal movement along a path of travel extending transversely of its longitudinal axis;
a pair of cranks;
means pivotally mounting said cranks adjacent respective ends of said carriage;
a prime mover coupled with one of said cranks for oscillating the latter about its pivot;
linkage means connecting said one crank with the other of said cranks to cause said other crank to be oscillated about its pivot through an arc equivalent to the arc through which the one crank is oscillated by the prime mover; and
a drive connection between each of said cranks and the corresponding end of the carriage for reciprocating the latter as the cranks oscillate about their pivots, whereby the longitudinal axis of the carriage remains in a constant angular relationship to the path of travel of the carriage during reciprocation thereof.

17. The invention of claim 16,
said linkage means including a pair of elongated tension members interconnecting said cranks,
said members being connected with each crank at spaced points thereon disposed to cause the members to shift longitudinally in opposite directions as the cranks oscillate.

References Cited

UNITED STATES PATENTS

| 3,325,049 | 6/1967 | Craven et al. | 221—129 X |
| 3,379,342 | 4/1968 | Newberry | 221—129 |

STANLEY H. TOLLBERG, Primary Examiner.